United States Patent [19]

Savage et al.

[11] Patent Number: 5,219,214
[45] Date of Patent: Jun. 15, 1993

[54] ANTI-LOCK BRAKE SYSTEM PERMANENT MAGNET MOTOR HAVING DIFFERENTIAL PERFORMANCE CHARACTERISTICS

[75] Inventors: Jack W. Savage, Centerville; Donald F. Harker, IV, Dayton; John S. Maceross, Spring Valley, all of Ohio

[73] Assignee: General Motors Corporation, Detroit, Mich.

[21] Appl. No.: 936,485

[22] Filed: Aug. 28, 1992

[51] Int. Cl.⁵ .............................................. B60T 8/32
[52] U.S. Cl. ................... 303/115.2; 188/162; 303/20; 303/100; 303/103; 303/110; 364/426.02
[58] Field of Search ............... 303/115.2, 113.2, 113.3, 303/100, 110, 113.1, 105, 106, 102, 103, 20; 188/162, 181 R, 181 T, 181 A; 318/138, 254, 292, 294; 364/426.02, 426.01, 426.03

[56] References Cited

U.S. PATENT DOCUMENTS

| | | | |
|---|---|---|---|
| 4,917,445 | 4/1990 | Leppek et al. | 303/115.2 X |
| 4,926,099 | 5/1990 | Ricker et al. | 318/254 |
| 4,986,614 | 1/1991 | Ricker et al. | 303/115.2 |
| 4,997,237 | 3/1991 | Ricker et al. | 303/115.2 |
| 5,000,524 | 3/1991 | Savage | 303/115.2 |
| 5,102,207 | 4/1992 | Leppek et al. | 303/115.2 |

*Primary Examiner*—Douglas C. Butler
*Attorney, Agent, or Firm*—Mark A. Navarre

[57] ABSTRACT

An electric motor-driven brake pressure modulator having two auxiliary field windings, one which is connected in series with the rotor of a permanent magnet field DC motor and another connected in parallel with the series-connected winding and rotor, to produce different speed/torque performance characteristics depending on the direction of motor rotation. In forward motor rotation when the brake pressure is to be increased, the mmfs of the auxiliary field windings aid the mmf of the field magnets to produce a higher flux in the working air gap of the motor. This maximizes the torque characteristic of the motor for the development of adequate brake pressure. In the reverse direction of motor rotation when the brake pressure is to be decreased, the mmfs of the auxiliary field windings oppose the mmf of the field magnets to produce a lower flux in the working air gap of the motor. This maximizes the speed characteristic of the motor to quickly reduce the brake pressure.

3 Claims, 2 Drawing Sheets

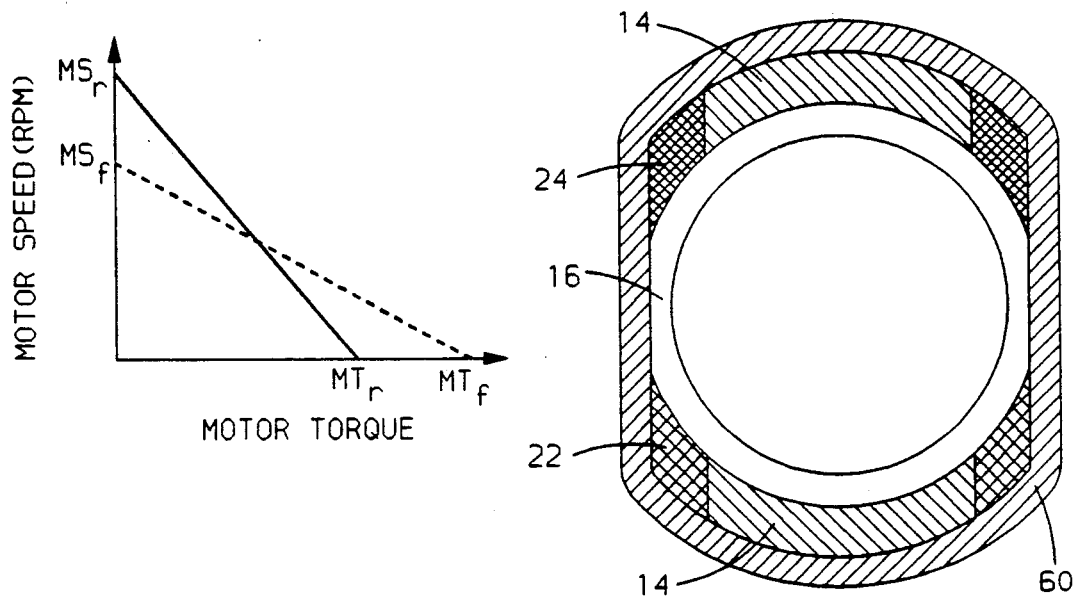
FIG. 3
FIG. 5
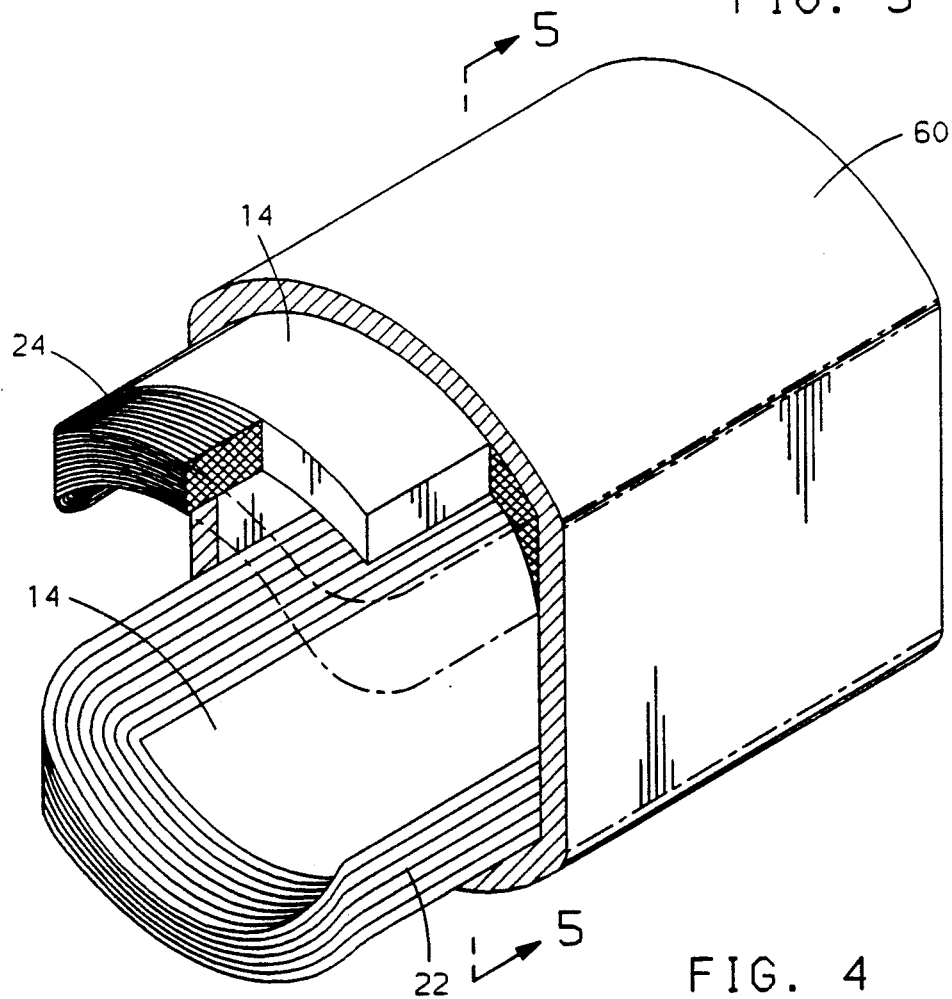
FIG. 4

ANTI-LOCK BRAKE SYSTEM PERMANENT MAGNET MOTOR HAVING DIFFERENTIAL PERFORMANCE CHARACTERISTICS

This invention relates to an electric motor-driven brake pressure modulator for a motor vehicle anti-lock braking system, and more particularly to a modulator including a bi-directional permanent magnet field DC motor having differential performance characteristics depending upon the direction of motor rotation.

BACKGROUND OF THE INVENTION

An electric motor-driven anti-lock braking system of the type to which this invention pertains is generally depicted in FIG. 1. Referring to FIG. 1, the braking system comprises a hydraulic boost unit 100, a wheel brake 102, an electric motor-driven hydraulic pressure modulator 104, and an electronic controller 106 for operating the modulator 104 with current from the vehicle storage battery 108. The boost unit 100 develops hydraulic pressure in line 120 in relation to the force applied to an operator-manipulated brake pedal, the line 120 being connected to the brake 102 via modulator 104 and brake line 122. Brake 102 is depicted as a disk brake caliper which develops braking force on the wheel rotor 126 in relation to the hydraulic pressure in brake line 122.

The modulator 104 comprises an actuator 130 axially displaceable in the modulator bore 132, a check ball 134 resiliently seated on a ball seat 136 disposed between the brake lines 120 and 122, and a bi-directional permanent field magnet DC motor 138 coupled to the actuator 130 via a reduction gearset 140 and a ball screw 142 to control the axial displacement of actuator 130.

Energization of the motor 138 is controlled by the electronic controller 106 in response to a signal on line 144 indicative of the angular velocity of rotor 126. When the controller 106 energizes the motor 138 for rotation in a forward direction, the ball screw 142 extends into the bore 132, thereby extending actuator 130 to unseat the check ball 134. This opens the communication between brake lines 120 and 122, and represents the normal or quiescent state of the anti-lock brake system. When the controller 106 energizes the motor 138 for rotation in the opposite, or reverse, direction, the ball screw 142 retracts actuator 130 within the bore 132, permitting spring 146 and the fluid pressure in brake line 120 to seat the check ball 134 on the ball seat 136, thereby isolating the brake line 122 from the brake line 120. In this condition, the brake fluid in line 122 backfills the modulator bore 132, relieving the fluid pressure developed at brake 102.

In anti-lock operation, the brake pressure in line 122 is modulated by repeatedly reversing the direction of rotation of motor 138 to effect a dithering movement of the actuator 130 in the bore 132. When an incipient wheel lock condition is detected, the controller 106 causes the motor 138 to rotate in the reverse direction to retract the actuator 130; when recovery of the wheel speed is detected, the controller 106 causes the motor 138 to rotate in the forward direction to extend the actuator 130 for increasing the brake pressure.

During the anti-lock operation described above, optimum braking performance requires different motor speed/torque characteristics depending on the direction of motor rotation. When the actuator 130 is being retracted (reverse direction of rotation), the torque requirement is relatively low, but the speed requirement is relatively high in order to enable quick relief of the brake pressure. When the actuator 130 is being extended (forward direction of rotation), the speed requirement is relatively low, but the torque requirement is relatively high in order to develop adequate pressure in brake line 122. Unfortunately, the speed/torque characteristics of a conventional DC electric motor are substantially the same in both directions, and some design compromises must be made in order to provide acceptable performance in both the forward and reverse directions of motor rotation. Of course, this involves some sacrifice in the anti-lock braking performance.

Directional speed/torque characteristics of permanent magnet field DC motors have been successfully varied through the use of auxiliary field coils wound around the stator permanent magnets and connected electrically in parallel with the windings of the rotor; see U.S. Pat. No. 5,000,524 to Savage, issued on Mar. 19, 1991, and assigned to the assignee of the present invention. In the forward direction of motor rotation, the auxiliary windings improve the motor torque characteristic by increasing the flux in the working air gap of the motor. In the reverse direction of motor rotation, the auxiliary windings improve the motor speed characteristic by decreasing the flux in the working air gap.

Some vehicular anti-lock braking systems are limited in the physical size of the motor housing and the magnitude of the motor current available. Without increasing the size of the housing, incorporating auxiliary field coils as noted above would require reducing the size of the permanent magnets to provide sufficient space around the periphery of the magnets for the field coils. Reducing the size of the permanent magnets would automatically improve the motor speed characteristic in the reverse direction of motor rotation by reducing the working air gap flux as a result of the loss of magnet material. However, the motor torque characteristic in the forward direction of motor rotation would be adversely impacted by the loss of the working air gap flux. Constructing a shunt coil large enough to supply the lost air gap flux would be possible were it not for the maximum motor current limitation. Torque is a function of both air gap flux and rotor winding current. The parallel configuration of a sufficiently sized auxiliary motor field coil significantly diminishes the current available for the rotor winding, thereby preventing the development of sufficient torque.

SUMMARY OF THE PRESENT INVENTION

The present invention is directed to an improved electric motor-driven brake pressure modulator for an anti-lock braking system of the above type having (1) a first auxiliary field winding connected electrically in series with the rotor winding of a permanent magnet field DC motor and (2) a second auxiliary field winding connected electrically in parallel with the series-connection of (1) to produce different speed/torque performance characteristics depending on the direction of motor rotation. The second auxiliary winding is excited in relation to the motor voltage while the first auxiliary winding is excited in relation to the diminished armature current.

In the forward direction of motor rotation, when the actuator 130 is extended to increase the pressure in brake line 122, the magnetomotive force (mmf) of the auxiliary field windings aid the mmf of the field magnets to produce a higher flux in the working air gap of the motor, approaching the air gap flux of the original permanent magnet (before downsizing). This maximizes the torque characteristic of the motor for the development of adequate brake pressure. In the reverse direction of motor rotation, when the actuator 130 is retracted within the bore 132, the mmf of the auxiliary field windings oppose the mmf of the field magnets to lower the flux in the working air gap of the motor, approaching the reduced air gap flux of the original magnet (before downsizing) with a parallel connected auxiliary field winding. This maximizes the speed characteristic of the motor to quickly reduce the brake pressure. The result is an anti-lock braking system, limited by motor size and current restrictions, in which the braking performance is maximized.

Alternative arrangements for achieving the above-described motor performance characteristics are disclosed and claimed in the following U.S. patents, also assigned to the assignee of the present invention: U.S. Pat. No. 4,926,099, issued May 15, 1989, entitled "Bimodal Controller for a Multi-Phase Brushless DC Motor"; U.S. Pat. No. 4,986,614, issued Jan. 22, 1991, entitled "Motor-Driven Antilock Brake Pressure Modulator Having Differential Motor Performance Characteristics"; and U.S. Pat. No. 4,997,237, issued Mar. 5, 1991, entitled "Bi-Modal DC Motor Control for a Motor Driven Anti-Lock Brake System".

BRIEF DESCRIPTION OF THE DRAWINGS

FIG. 3 depicts the motor speed vs. torque characteristics for the forward and reverse directions of motor rotation.

FIGS. 4 and 5 illustrate a design embodiment and a sectional view of that embodiment, respectively, for the motor depicted in FIG. 2.

DETAILED DESCRIPTION OF THE PREFERRED EMBODIMENTS

Figure 2:
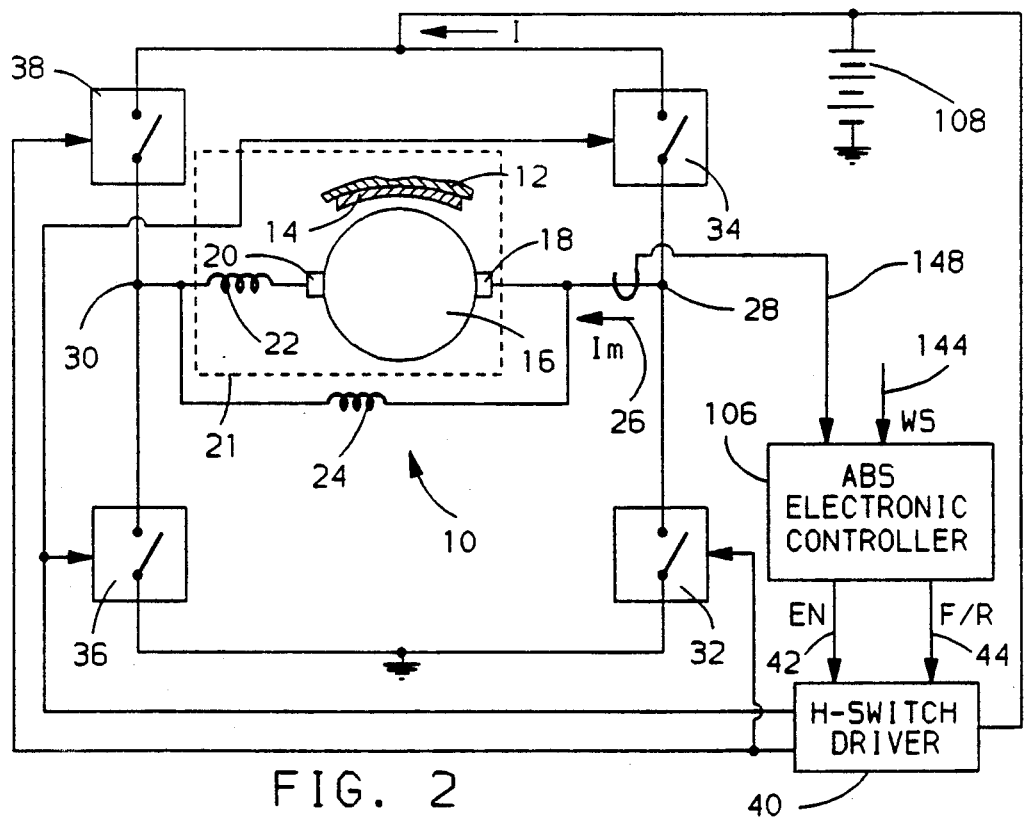
FIG. 2 is a schematic diagram of a motor drive arrangement including a permanent magnet DC motor having auxiliary field windings according to the present invention.

Referring to FIG. 2, the reference numeral 10 generally designates a schematic representation of a permanent field magnet DC motor according to this invention. The DC motor 10 comprises a stator 12 including two or more permanent magnets 14 defining the motor field poles and a wound rotor 16 defining corresponding rotor poles (not shown). The brushes 18 and 20 ride on a conventional commutator (not shown) comprising a plurality of rotary conductor segments affixed to the rotor 16. The conductor segments, in turn, are connected to distributed turns of the rotor winding (not shown) to ensure that the rotor poles are magnetized in relation to the rotor position to produce torque for turning the rotor in the desired direction.

An armature circuit 21 comprises a first auxiliary field winding 22 (hereinafter referred to as the series coil) connected electrically in series with the rotor winding 16 via commutator brush 20. Alternatively, the series coil 22 could be connected electrically in series with the rotor winding 16 via commutator brush 18. A second auxiliary field winding 24 (hereinafter referred to as the shunt coil) is connected electrically in parallel with the armature circuit 21. In the illustrated embodiment, the stator 12 has two permanent magnets 14, and the coils 22 and 24 are individually wound around the respective permanent magnets 14, as shown in FIGS. 4 and 5.

In operation, both coils 22 and 24 produce a magnetomotive force, or mmf, which either adds to or subtracts from the mmf produced by the permanent magnets 14. This, in turn, either increases or decreases the magnetic flux in the working air gap between the stator 12 and rotor 16. Significantly, the mmf produced by the permanent magnets 14 is unidirectional, while the mmf produced by the coils 22 and 24 is bi-directional depending on the direction of motor current.

When the motor current Im is in the direction of arrow 26, that is, from terminal 28 to terminal 30, the rotor winding is energized via brushes 18 and 20 for producing a first (forward) direction of motor rotation for increasing the brake pressure. The sense or polarity of the coils 22 and 24 is such that during this condition, their mmfs aid the mmf of the permanent magnets 14. As a result, the air gap flux is increased, and the motor torque is maximized.

When the motor current Im is in a direction opposite to arrow 26, that is, from terminal 30 to terminal 28, the rotor winding is energized via brushes 18 and 20 for producing a second (reverse) direction of motor rotation for releasing the brake pressure. In this case, coils 22 and 24 produce mmfs of the opposite polarity which oppose the mmf of the permanent magnets 14. As a result, the air gap flux is decreased, and the motor speed is maximized to relatively quickly retract the actuator 130 within the valve bore 132 to relieve the brake pressure.

Figure 1:
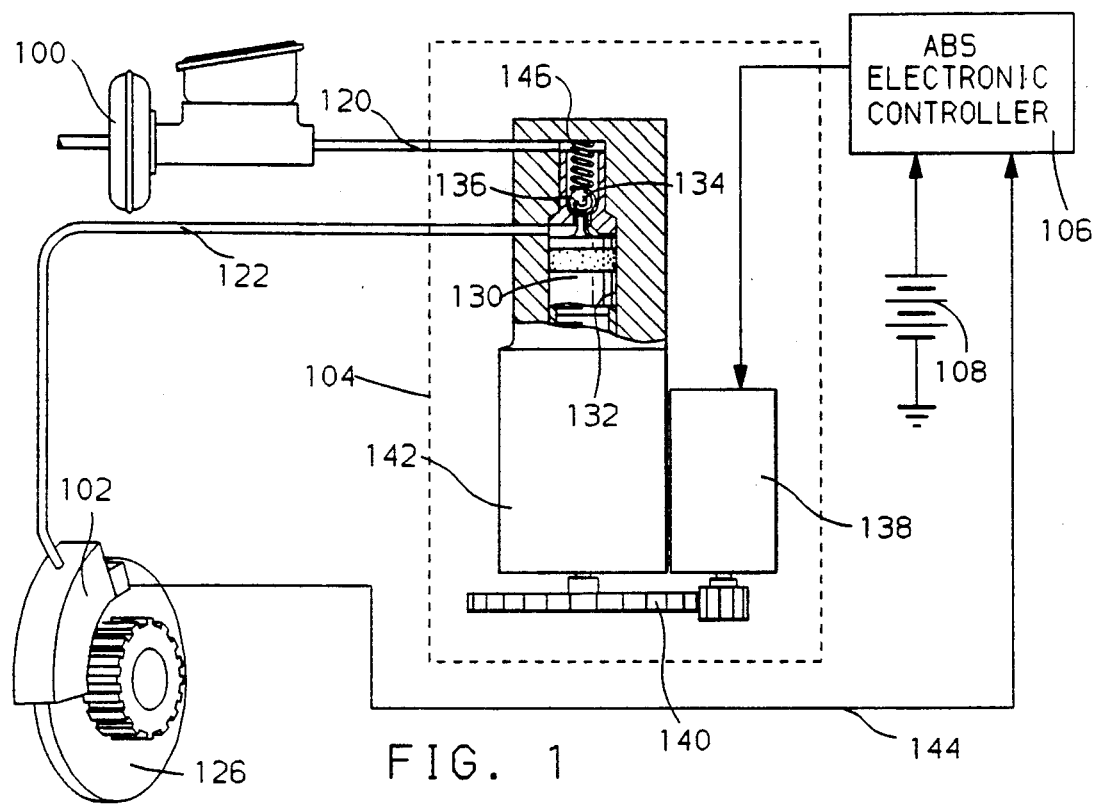
FIG. 1 is a system drawing of a vehicular anti-lock braking system of the type to which the present invention pertains.

The motor current is supplied from a vehicle storage battery 108 via a bridge or H-switch comprising the electronic switches 32, 34, 36 and 38. The switches 32 through 38, which may be transistors, relays or other switching devices, are operated by a conventional H-switch driver circuit 40, which in turn is controlled by the ABS electronic controller 106. The enable (EN) and forward/reverse (F/R) inputs on lines 42 and 44 are generated by the controller 106 in response to vehicle wheel speed information (W$) as described above in reference to FIG. 1, and motor current Im via signal line 148 as described below.

The bridge switches 32 and 34 selectively connect the motor terminal 28 to the negative (ground) and positive terminals of battery 108, respectively. The bridge switches 36 and 38 selectively connect the motor terminal 30 to the negative (ground) and positive terminals of battery 108, respectively. When it is desired to increase the brake pressure, the ABS electronic controller 106 signals the H-switch driver 40 to close the bridge switches 34 and 36 to produce motor current Im in the direction of arrow 26. When it is desired to decrease the brake pressure, the ABS electronic controller 106 signals the H-switch driver 40 to close the bridge switches 32 and 38 to produce motor current Im in the opposite direction.

Motor current Im, providing excitation current for the armature circuit 21 and shunt coil 24, is limited to a maximum value by the ABS electronic controller 106 in response to a signal on line 148 indicative of the motor current Im. When a maximum motor current level is sensed by the ABS electronic controller 106, the controller signals the H-Switch Driver 40 via the enable (EN) and forward/reverse (F/R) inputs on lines 42 and 44 to open the conducting switches (34 and 36 for forward motor operation, 32 and 38 for reverse motor operation). With the switches open, the motor current Im begins to decay below the maximum allowable level with the collapsing magnetic fields in the rotor winding and auxiliary field coils 22 and 24. After a predetermined amount of time, based upon the combined inductance of the rotor winding and auxiliary field windings, the controller 106 signals to the H-Switch Driver 40 to reclose the appropriate switches. A sustained maximum current draw by the motor 10 will result in the repeated cycling of the appropriate H-Bridge switches.

In consequence of the current limiting feature of the ABS electronic controller 106, the presence of shunt coil 24 connected electrically in parallel with the armature circuit 21 diminishes the current available for the rotor winding 16 by an amount equal to the shunt coil excitation current. The presence of series coil 22 further diminishes the current available for the rotor winding 16 by adding to the impedance of the armature circuit 21.

To minimize the diminution of current flow through the rotor winding 16, shunt coil 24 is constructed from many turns of relatively small diameter wire for high impedance and low current flow while series coil 22 is constructed from few turns of relatively large diameter wire for low impedance and high current flow. This distinction is graphically illustrated in FIGS. 4 and 5.

FIG. 3 graphically depicts the motor speed as a function of motor output torque. The forward direction characteristic is designated by the broken trace, and the reverse direction characteristic is designated by the solid trace. It will be seen that the free speed of the motor in the reverse direction, $MS_r$, is significantly greater than in the forward direction, $MS_f$. This occurs because the induced emf is proportional to the product of the air gap flux and the motor speed. In forward operation when the air gap flux is increased by the coils 22 and 24, the free speed is lower. In reverse operation when the air gap flux is decreased by the coils 22 and 24, the free speed is higher.

It can also be seen from FIG. 3 that the stall torque of the motor in the forward direction, MTf, is substantially greater than in the reverse direction, MTr. This occurs because the stall torque is proportional to the product of the air gap flux and the rotor current. In forward operation when the air gap flux is increased by the coils 22 and 24, the torque is higher. In reverse operation when the air gap flux is decreased by the coils 22 and 24, the torque is lower.

FIGS. 4 and 5 depict an embodiment of this invention in the context of a flatted case DC motor. The permanent magnets 14 are glued or otherwise secured in a motor case 60, which is equivalent to the stator 12 of FIG. 2, and the coils 22 and 24 are wound around respective magnets 14. Shunt coil 24 is constructed from many turns of relatively small diameter wire, and series coil 22 is constructed from few turns of relatively large diameter wire.

While the present invention has been described in reference to the illustrated embodiments, it will be recognized that various modifications will occur to those skilled in the art. For example, similar advantages may be achieved by using two serially connected shunt coils instead of a single shunt coil as shown in the illustrated embodiments. In this case, the individual shunt coils would combine to comprise an equal number of turns as the single shunt coil, so that the total ampere-turn product of the shunt winding would remain the same. Similarly, two serially connected series coils could be used instead of a single series coil. In this regard, it will be understood that the systems incorporating such modifications may fall within the scope of this invention, which is defined by the appended claims.

The embodiments of this invention in which an exclusive property or privilege is claimed are defined as follows:

1. A vehicle brake pressure modulator including an actuator displaceable to develop a regulated fluid brake pressure, and pressure control means including an electric motor drivingly connected to said actuator and adapted to be driven in forward and reverse directions to effect forward and reverse displacement of said actuator for increasing and decreasing said brake pressure, the improvement wherein:
   the electric motor includes a wound rotor and a stator having permanent magnet field poles;
   a first auxiliary winding is wound around at least one of said permanent magnet field poles and connected electrically in series with said wound rotor;
   a second auxiliary winding is wound around at least one of said permanent magnet field poles and connected electrically in parallel with the series-connection of said first auxiliary winding and said wound rotor; and
   said first and second auxiliary windings acting (1) in the forward direction produce mmf which magnetically aids said permanent magnet for maximizing motor torque developed to increase brake pressure and (2) in the reverse direction produce mmf which magnetically opposes said permanent magnet for maximizing motor speed developed to decrease brake pressure.

2. The improvement set forth in claim 1, wherein said first auxiliary winding is constructed to have a characteristic impedance which is low relative to that of the wound rotor, and said secondary auxiliary winding is constructed to have a characteristic impedance which is high relative to the series-connection of said first auxiliary winding and said wound rotor.

3. The improvement set forth in claim 2, wherein (1) said first auxiliary winding comprises few turns of large diameter wire relative to said wound rotor, minimizing a first resultant diminution of current flow through said wound rotor, and (2) said second auxiliary winding comprises many turns of small diameter wire relative to the first auxiliary, minimizing a second resultant diminution of current flow through the wound rotor under motor current limiting conditions.

* * * * *